United States Patent
Klein et al.

(10) Patent No.: US 12,222,785 B2
(45) Date of Patent: *Feb. 11, 2025

(54) MAXIMIZING SYSTEM POWER CALIBRATION ALGORITHM ACCURACY

(71) Applicant: DELL PRODUCTS L.P., Round Rock, TX (US)

(72) Inventors: Craig Anthony Klein, Elgin, TX (US); Doug E. Messick, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/159,844

(22) Filed: Jan. 26, 2023

(65) Prior Publication Data

US 2024/0256019 A1    Aug. 1, 2024

(51) Int. Cl.
*G06F 1/00* (2006.01)
*G06F 1/26* (2006.01)

(52) U.S. Cl.
CPC .................................... *G06F 1/26* (2013.01)

(58) Field of Classification Search
CPC ........................................................ G06F 1/26
See application file for complete search history.

(56) References Cited

U.S. PATENT DOCUMENTS

| | | | |
|---|---|---|---|
| 6,954,706 B2 | 10/2005 | Poirier et al. | |
| 2008/0012584 A1 | 1/2008 | Pai et al. | |
| 2021/0066928 A1* | 3/2021 | Maji | H02J 7/0013 |
| 2023/0109810 A1* | 4/2023 | Chialastri | G06F 1/26 |
| | | | 700/300 |
| 2024/0069612 A1* | 2/2024 | Messick | G06F 1/28 |
| 2024/0085963 A1* | 3/2024 | Klein | G06F 1/3296 |

* cited by examiner

*Primary Examiner* — Xuxing Chen
(74) *Attorney, Agent, or Firm* — Larson Newman, LLP

(57) ABSTRACT

An information handling system includes a power supply unit, a processor, and a baseboard management controller. The power supply unit includes a first energy counter configured to store first power level information associated with an amount of power supplied by the power supply unit. The processor includes a second energy counter configured to store second power level information associated with an amount of power consumed by the processor. The baseboard management controller periodically calibrates the second power level to the first power level based upon a variable calibration cycle time.

20 Claims, 3 Drawing Sheets

MAXIMIZING SYSTEM POWER CALIBRATION ALGORITHM ACCURACY

FIELD OF THE DISCLOSURE

This disclosure generally relates to information handling systems, and more particularly relates to maximizing system power calibration algorithm accuracy in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a power supply unit, a processor, and a baseboard management controller. The power supply unit may include a first energy counter configured to store first power level information associated with an amount of power supplied by the power supply unit. The processor may include a second energy counter that indicates second power level information associated with an amount of power consumed by the processor. The baseboard management controller may periodically calibrate the second power level to the first power level based upon a variable calibration cycle time.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures as needed or desired.

Power supply units (PSUs) of an information handling system typically provide an analog power signal, such as Psys (platform power) introduced by Intel®, to processor voltage regulators of the information handling system. The analog power signal represents the instantaneous power supplied to the system by the PSUs as a fraction of the total maximum power capacity of the PSUs. The analog power signal may also be used to control the system power level under a programmable limit. As such, the analog power signal may be used in system-level power control and hardware protection policies of the information handling system.

Processor manufacturers typically provide power measurement accuracy requirements for their processors. For example, Intel's power measurement accuracy requirement is +/−3% at above 50% load. An error greater than the power measurement accuracy requirement can impact a processor's power control loops. For example, if a processor measures its consumed power at 4% too low, then the enforcement of power limits set by hardware and/or user policies may be adversely affected, which may lead to performance degradation. In addition, an end-user may determine that the processor is not performing at its expected performance level.

A power measurement accuracy scheme as described herein provides for the simple periodic measurement and calibration of the power measurement accuracy. However, the inventors of this disclosure have understood that the simple periodic measurement and calibration of the power measurement accuracy may not be sufficient to meet the power measurement accuracy requirement in all operating conditions. In particular, because the power delivery demands on a modern server are broad ranged and change rapidly, the typical duration for the simple periodic solution may not adequately account for changes in the power delivery demands, particularly at higher power ranges.

Figure 1:
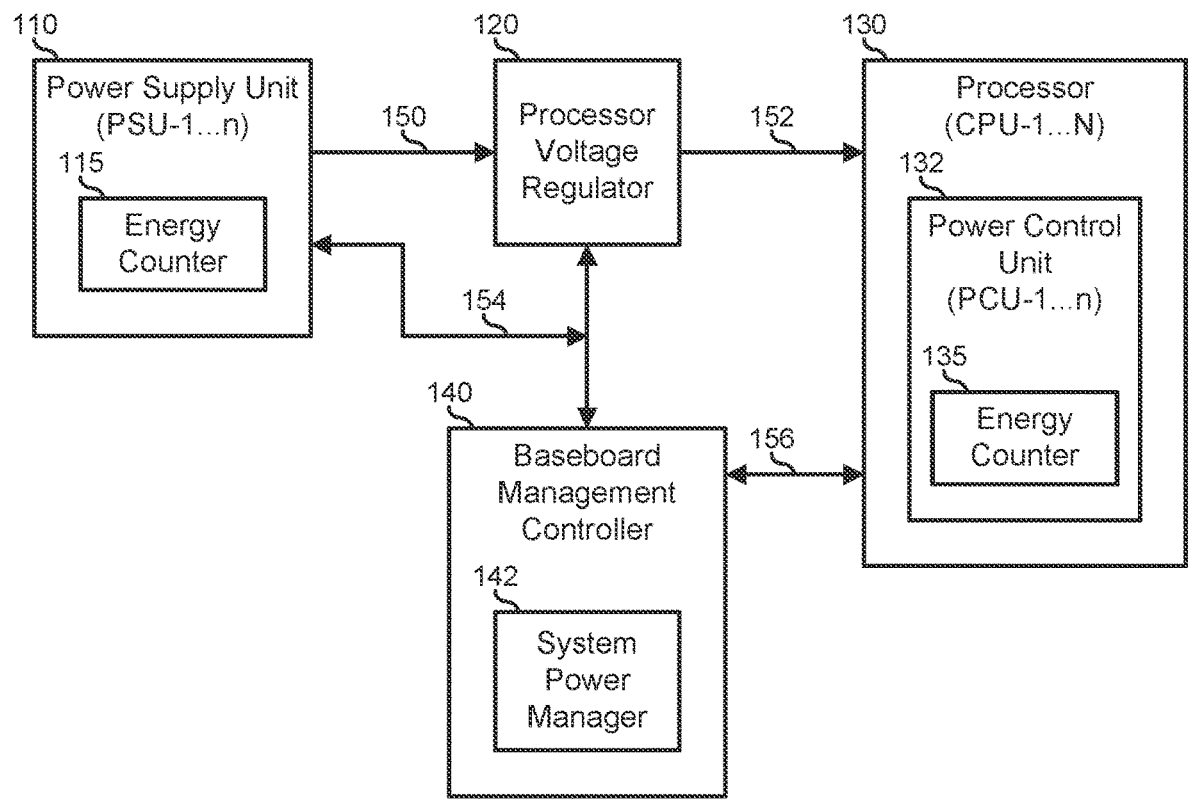
FIG. 1 is a block diagram of an information handling system according to an embodiment of the current disclosure.

FIG. 1 illustrates a power delivery system 100 for calibrating processor system power consumption in an information handling system such as information handling system 700 as described below. Power delivery system 100 provides a closed loop calibration algorithm that may be used to dial out an error of an analog power signal to deliver more accurate power measurement results. Power delivery system 100 includes one or more power supply units (PSUs) 110-1 through 110-n (referred to collectively as "PSU 110"), a voltage regulator 120, one or more processor 130-1 through 130-n (referred to collectively as "processor 130"), and a baseboard management controller (BMC) 140. In various embodiments, the components of power delivery system 100 may be implemented in hardware, software, firmware, or any combination thereof. The components shown are not drawn to scale and power delivery system 100 may include additional or fewer components. In addition, connections between components may be omitted for descriptive clarity. Furthermore, some components that are represented as separate components may in certain embodiments instead are integrated with other components. For example, in certain embodiments, all or a portion of the functionality provided by the illustrated components may instead be provided by components integrated into one or more processor(s) as a system-on-a-chip.

PSU 110 represents a system, device, or apparatus configured to supply electrical current to one or more resources or components of an information handling system on one or more direct current power rail as needed or desired. For example, PSU 110 may represent a hot-swappable power controller, a battery, capacitor, or other energy storage device, or the like. PSU 110 is connected to provide power to the components ("the load") of the information handling system. In particular, PSU 110 provides power to processor 130 via voltage regulator 120. Note that as illustrated in FIG. 1 and the following figures, the power rails, power planes, and other power delivery routing, such as the power rails between PSU 110 and voltage regulator 120, and power planes between the voltage regulator and processor 130, are not illustrated, and that the illustrated interconnections between the components are to be understood as various data and control signals, as described below. Here, PSU 110 provides an analog power signal 150 to voltage regulator 120, and is connected to a data interface 154 between the PSU, the voltage regulator, and BMD 140. An example of data interface 154 may include a two-wire data communication interface, such as a PMBus interface, an I2C interface, or the like.

PSU 110 includes energy counter 115 that is configured to monitor the amount of power and/or energy currently being provided by PSU 110 to the information handling system. For example, energy counter 115 may calculate an average power provided by PSU 110 over a period of time. In a particular embodiment, energy counter 115 are configured to calculate a running average of actual power measurements from PSU 110. In this regard, the power measurement provided by energy counter 115 represents a calibration standard, target power level, or "center of truth" for the measured power, to which the average power consumption of processor 130 may be calibrated. For example, BMC 140 operates to read the energy counter 115 via data interface 154 in order to determine the average power provided by PSU 110 to voltage regulator 120.

Voltage regulator 120 represents a device, system, or apparatus, configured to provide a regulated voltage and current to processor 130. Voltage regulator 120 receives analog power signal 150 from PSU 110 and provides a system digitized power measurement over interface 152 to processor 130. Interface 152 may be an Intel Serial VID interface (SVID). System power signal 152 operates to inform processor 130 of the instantaneous system power level. In a particular case, voltage regulator 120 converts analog power signal 150 into system digitized power measurement over interface 152. The regulated voltage and current provided from voltage regulator 120 to processor 130 is adjusted based upon a system gain setting, (or "conversion factor") received from BMC 140 via data interface 154. The system gain setting may be a system voltage gain setting, or may be a current gain setting, such as ISYS_GAIN of VR14™ by Intel®, and is used to further control the delivered instantaneous power. The value of the system gain setting is stored in a register of voltage regulator 120. The value of the system gain setting is dynamically increased or decreased at runtime to ensure that the power consumption of processor 130 matches the power provided by PSU 110. An example of a system gain setting may include an ISYS_GAIN register, as needed or desired.

Processor 130 includes a power control unit (PCU) 132 which resides in a system agent of each processor and is a combination of hardware state machines and an integrated microcontroller. PCU 132 may be configured to collect telemetry information, such as power consumption and junction temperature. PCU 132 includes energy counter 135 that is configured to monitor the power consumption of processor 130 over a certain configurable time window. For example, energy counter 135 may calculate an average power consumed by processor 130 over a particular period. In one embodiment, each energy counters 135 may be part of a running average power limit module. In a particular embodiment, energy counter 135 is configured to take a running average of actual power measurements from processor 130. The actual power measurements may be derived from reported instantaneous power from voltage regulator 120. BMC 140 is configured to read the energy counters 135 to determine the average power consumed by processor 130 via a data interface 156. An example of data interface 156 may include a Platform Environment Control Interface (PECI) interface that provides a single wire serial interface for communication between Intel® processors and chipset components to external system management logic, such as BMC 140.

BMC 140 includes a system power manager 142 that is configured to read the energy consumption information from energy counters 115 and 135 via data interface 154. Based on the energy consumption information from energy counters 115 and 135, system power manager 142 determines whether the reported average power consumed by processor 130 matches a particular average power target, such as the reported average power provided by PSU 110s. If the average power consumed by processor 130 does not match the average power provided by PSU 110, system power manager 142 calculates a value of the system gain setting and programs voltage regulator 120 with the calculated system gain setting value. Voltage regulator 120 utilizes the system gain setting to calibrate the average power consumed by processor 130 to match the average power provided by PSU 110. Thus, by adjusting the value of the system gain setting in voltage regulator 120, the instantaneous power provided to processor 130 may be adjusted to ensure that the running average of the actual power measurements of the processor matches the running average of actual power measurements from PSU 110. For example, system power manager 142 may adjust the value of the system gain setting based on whether the average power consumption of processor 130 is greater than, less than, or equal to the average power measurements from PSU 110.

In a particular embodiment, system power manager 142 is configured to periodically perform the calibration of the power consumed by processor 130 with the power provided from PCU 110. For example, system power manager 142 may perform the calibration every one hundred milliseconds, or another time duration, as needed or desired. Further, system power manager 142 may be configured to implement adjustments to the system gain setting within a relatively short period, such as in the order of one microsecond, upon detection that the average power consumption of processor 130 does not match the average power measurements of PSU 110. Because of the frequency of the calibration and the adjustment performed in a short period, BMC 140 may be able to respond quickly to dynamic events, such as load changes, PSU redundancy changes, or PSU hot spare state changes, with a high accuracy rate.

Figure 2:
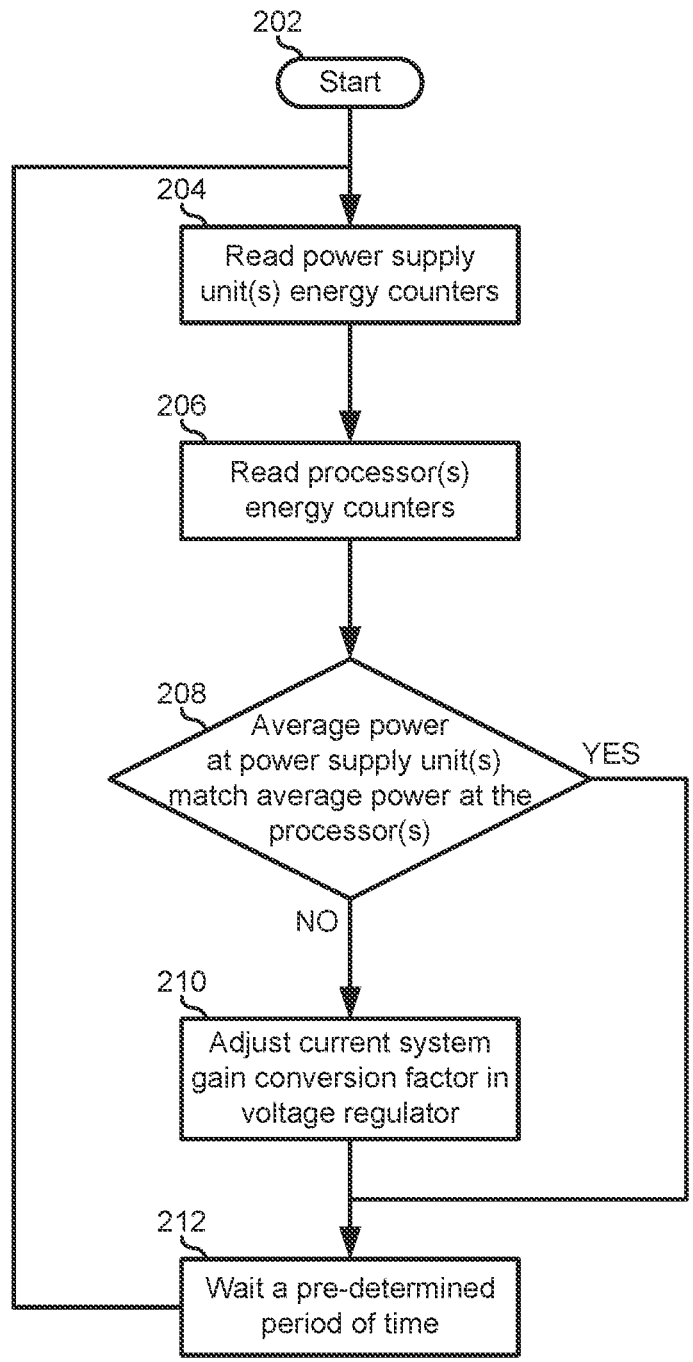
FIG. 2 is a flowchart illustrating a method for calibrating processor system power consumption according to an embodiment of the current disclosure.

FIG. 2 illustrates a method 200 for calibrating processor system power consumption, starting at block 202. The energy counters of the PSUs of an information handling system are read in block 204. The energy counters of the processors of the information handling system are read in block 206. A decision is made as to whether the power consumed by the processors matches the power provided by the PSUs in decision block 208. If not, the "NO" branch of decision block 208 is taken, the system gain setting is adjusted in the voltage regulator in block 210, a predetermined duration elapses in block 212, and the method returns to block 204 where the method is repeated. If the power consumed by the processors matches the power provided by the PSUs, the "YES" branch of decision block 208 is taken and the method proceeds to block 212.

At block 210, where the method adjusts the value of the system gain setting and programs the adjusted value in the voltage regulator, the method may update a register in the voltage regulator that is associated with the system gain setting. Calibrating the power consumption of the processor may be performed such as the average power measurement of the processor matches the average power measurement at the power supply units. For example, if the average power consumed by the processor is ninety watts and the power measured at the power supply unit is one hundred watts, the system gain setting may be adjusted such that the average power consumed by the processor increases to one hundred watts.

This calibration is performed to avoid over throttling or under throttling the processor among other issues when there is a mismatch between the power consumption of the processor and the power provided by the power supply unit. For example, the processor may be throttled if the system thinks that the processor is consuming more power than it actually does, which may affect the processor's performance. In another case, if the system thinks that the processor is consuming less power than it actually does, additional power may be provided to increase the processor's performance. This increase in power may exceed the power limit of a connector of the processor which may cause the connector to deteriorate.

Calibrating the system power includes calculating a value of the system gain setting based on the average power consumed by the processors versus the average power provided by the power supply units. The value of the system gain setting may vary in direct correlation with the average power consumption of the processor. For example, if the average power consumption of the processor is to be increased to match the average power provided by the power supply, then the system gain setting is increased. If the average power consumption of the processor is to be decreased to match the average power provided by the power supply, then the system gain setting is decreased.

At block 212, where the method waits for the predetermined period before proceeding to block 204, the method may wait for one millisecond, five milliseconds, ten milliseconds, a hundred milliseconds, or the like.

It has been understood by the inventors of the current disclosure that the above-described method for calibrating processor system power consumption may improve the efficiency and operation of the information handling system, but may yet fail to meet the power measurement accuracy requirements of the processor manufacturers. As such, in a particular embodiment, one or more of the following improvements can be performed in conjunction with the above described method: applying a variable calibration cycle time window, calibrating when the information handling system is determined to be operating at a higher power consumption level, and re-initializing the calibration whenever the configuration of the information handling system has been changed.

In a first case, calibration cycles are performed in accordance with a variable calibration cycle time window, a calibration cycle may be performed. In a particular embodiment, calibration cycles are performed in accordance with an algorithm that determines a variable calibration cycle time window as:

$$C = TS^N \qquad \text{Equation 1}$$

where C is the variable calibration cycle time window, or the duration between calibration cycle times, T is a calibration base cycle time, S is a sample multiplier, and N is an iteration number. The iteration number (N) may be initialized at N=0, and a first calibration cycle time ($C_0$) will occur at the calibration base cycle time (T). After the first calibration cycle, the iteration number can be incremented to N=N+1, and a second calibration cycle time ($C_1$) will occur at a time equal to the product of the calibration base cycle time (T) and the sample multiplier (S). Following calibration cycles may occur at calibration cycle times ($C_N$) based upon further incrementing of the iteration number N. In a particular embodiment, calibration cycles may be continued in accordance with Equation 1, with increasing durations between calibration cycles. In another embodiment, the duration between calibration cycles may reach a predetermined upper limit (M), after which no further calibration cycles are performed until other events precipitate a resetting of the iteration number (N), as described below. For example, where the calibration base cycle time (T) is set as one (1) second, the sample multiplier (S) is set as two (2), and the upper limit (M) is set as 32, calibration cycles will be performed at 1, 2, 4, 8, 16, and 32 seconds, and further calibration cycles will be halted until other events precipitate a resetting of the iteration number (N).

In a second case, calibration cycles are performed when the information handling system is determined to be operating at a higher power consumption level. In a particular embodiment, after the completion of a calibration cycle, such as the variable calibration cycle described above, a BMC records the power utilization of the information handling system. For example, a BMC may record the power utilization as provided by the energy counters of the PSUs of the information handling system. In particular, the power utilization, in Watts, may be recorded in a power attribute, such as a calPwrLmt register. After the calibration cycles have ceased, for example, in response to reaching an upper limit in the calibration cycle time, further calibration cycles are halted until the BMC detects that the power utilization has increased. For example, the BMC may read the power utilization from the energy counters of the PSUs and determine that the current power utilization level exceeds the previously recorded power utilization level. Then, when the current power utilization level exceeds the previously recorded power utilization level, the BMC operates to initiate a new calibration cycle, as described above.

Figure 3:
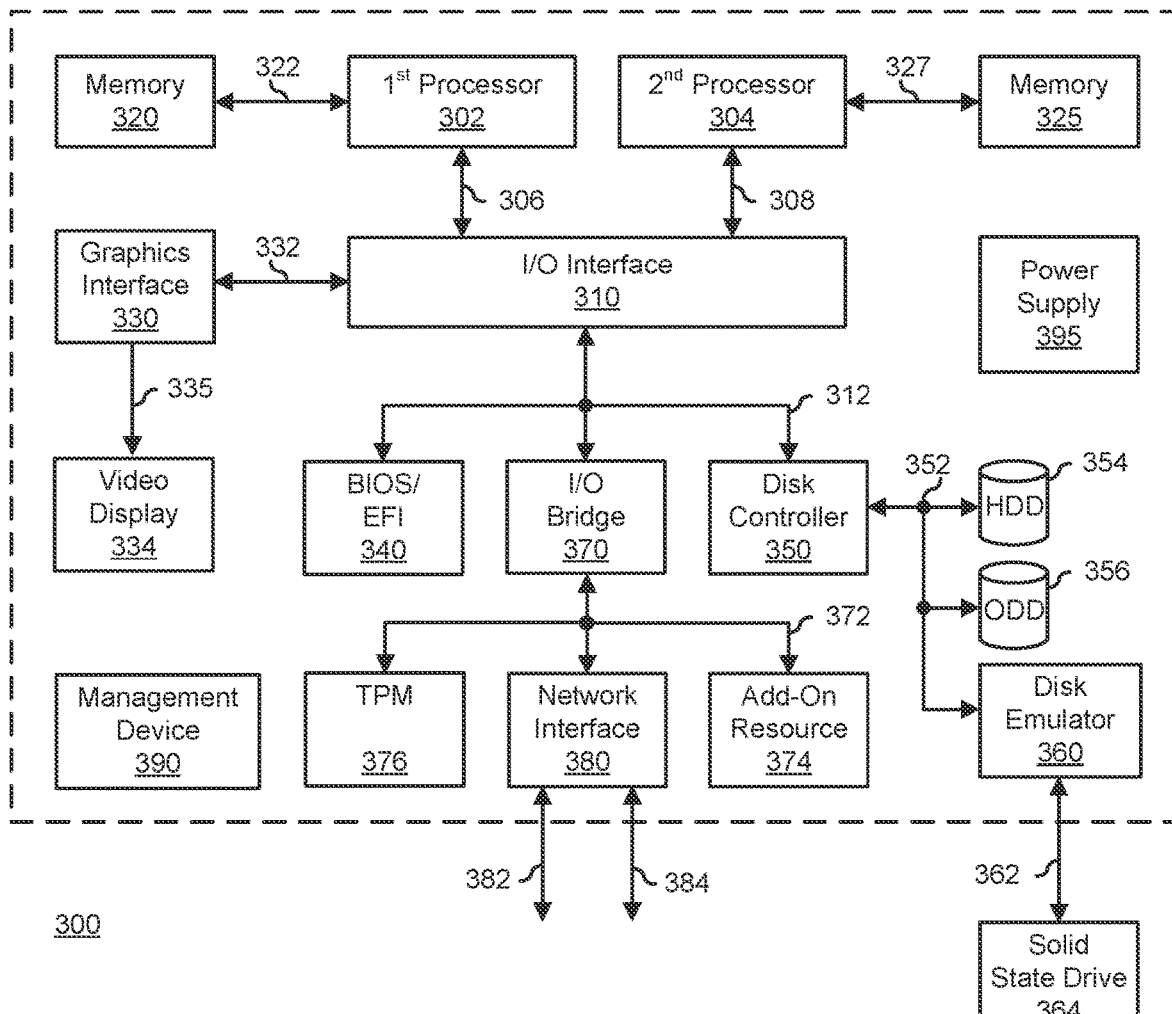
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a power supply unit including a first energy counter that indicates first power level information associated with an amount of power supplied by the power supply unit;
    a processor including a second energy counter that indicates second power level information associated with an amount of power consumed by the processor; and
    a baseboard management controller configured periodically calibrate the second power level to the first power level based upon a variable calibration cycle time.

2. The information handling system of claim 1, wherein the variable calibration cycle time is determined based upon a variable calibration cycle time window.

3. The information handling system of claim 2, wherein the variable calibration cycle time window is determined as:
    $C = T\ S^N$, where C is the variable calibration cycle time window, T is a calibration base cycle time, S is a sample multiplier, and N is an iteration number.

4. The information handling system of claim 3, wherein the periodic calibration is continued until the variable calibration cycle time window (C) reaches a predetermined upper limit.

5. The information handling system of claim 4, wherein, after the variable calibration cycle time window (C) reaches the predetermined upper limit, further periodic calibration is halted until a precipitating event occurs.

6. The information handling system of claim 5, wherein, after the precipitating event occurs, the iteration number (N) is reset, and the periodic calibration is repeated.

7. The information handling system of claim 5, wherein the precipitating event includes an increase in the first power level.

8. The information handling system of claim 5, wherein the precipitating event includes a configuration change to the information handling system.

9. The information handling system of claim 8, wherein the configuration change includes one of a hardware power protection limit change, a user system power cap change, a reboot of the information handling system, and a reboot of the baseboard management controller.

10. The information handling system of claim 9, wherein the change to the hardware power protection limit is in response to a power supply unit failure.

11. A method, comprising:
    providing, in a power supply unit of an information handling system, a first energy counter that indicates first power level information associated with an amount of power supplied by the power supply unit;
    providing a second energy counter that indicates second power level information associated with an amount of power consumed by a processor; and
    periodically calibrating, by a baseboard management controller of the information handling system, the second power level to the first power level based upon a variable calibration cycle time.

12. The method of claim 11, further comprising determining the variable calibration cycle time based upon a variable calibration cycle time window.

13. The method of claim 12, wherein the variable calibration cycle time window is determined as:

$C = TS^N$, where $C$ is the variable calibration cycle time window, $T$ is a calibration base cycle time, -continued S is a sample multiplier, and N is an iteration number.

14. The method of claim 13, wherein the periodic calibration is continued until the variable calibration cycle time window (C) reaches a predetermined upper limit.

15. The method of claim 14, wherein, after the variable calibration cycle time window (C) reaches the predetermined upper limit, further periodic calibration is halted until a precipitating event occurs.

16. The method of claim 15, wherein, after the precipitating event occurs, the iteration number (N) is reset, and the periodic calibration is repeated.

17. The method of claim 15, wherein the precipitating event includes an increase in the first power level.

18. The method of claim 15, wherein the precipitating event includes a configuration change to the information handling system.

19. The method of claim 18, wherein the configuration change includes one of a hardware power protection limit change, a user system power cap change, a reboot of the information handling system, and a reboot of the baseboard management controller.

20. An information handling system, comprising:
a power supply unit including a first energy counter configured to store first power level information associated with an amount of power supplied by the power supply unit;
a processor including a second energy counter configured to store second power level information associated with an amount of power consumed by the processor;
a voltage regulator configured to receive power from the power supply, and to provide a regulated voltage to the processor; and
a baseboard management controller configured periodically calibrate the second power level to the first power level based upon a variable calibration cycle time, wherein in calibrating the second power level, the baseboard management controller is further configured to change a conversion factor of the voltage regulator.

* * * * *